United States Patent
Sponsky

(10) Patent No.: US 9,488,098 B2
(45) Date of Patent: Nov. 8, 2016

(54) EXHAUST GAS RECIRCULATION MIXER DEVICE

(75) Inventor: John Sponsky, Chambersburg, MD (US)

(73) Assignee: MACK TRUCKS, INC., Greensboro, NC (US)

( * ) Notice: Subject to any disclaimer, the term of this patent is extended or adjusted under 35 U.S.C. 154(b) by 1149 days.

(21) Appl. No.: 12/863,323

(22) PCT Filed: Jan. 24, 2008

(86) PCT No.: PCT/US2008/000922
§ 371 (c)(1),
(2), (4) Date: Jul. 16, 2010

(87) PCT Pub. No.: WO2009/093993
PCT Pub. Date: Jul. 30, 2009

(65) Prior Publication Data
US 2011/0061634 A1    Mar. 17, 2011

(51) Int. Cl.
*B01F 5/04* (2006.01)
*F02B 47/08* (2006.01)
(Continued)

(52) U.S. Cl.
CPC ............ *F02B 47/08* (2013.01); *B01F 3/02* (2013.01); *B01F 5/045* (2013.01); *F02M 26/19* (2016.02); *B01F 2005/0034* (2013.01); *Y02T 10/121* (2013.01)

(58) Field of Classification Search
CPC ......... B01F 5/045; B01F 3/02; F02M 26/19; F02M 26/05; F02M 26/23
USPC ............ 123/568.15, 568.17, 590, 568.11; 701/108; 60/278
See application file for complete search history.

(56) References Cited

U.S. PATENT DOCUMENTS 1,541,583 A * 6/1925 Merz ................... 123/568.17
4,109,620 A * 8/1978 Webb ................... 123/184.46
(Continued)

FOREIGN PATENT DOCUMENTS

DE    10202612 A1    7/2003
EP    1384867 A1     1/2004
(Continued)

OTHER PUBLICATIONS

Patent Abstract of JP 2007-247626; Sep. 27, 2007; Nissan Motor Co Ltd.
(Continued)

*Primary Examiner* — Hai Huynh
*Assistant Examiner* — Gonzalo Laguarda
(74) *Attorney, Agent, or Firm* — Martin Farrell; Michael Pruden

(57) ABSTRACT

A device for mixing exhaust gas in an engine air intake includes a mixing chamber disposed or formed in an air intake conduit, the mixing chamber having an inlet for receiving intake air and an outlet for exhausting the intake air, and having a port between the inlet and the outlet and a mixer tube extending into the port, an end portion of the mixer tube disposed in the mixing chamber shaped as a cylindrical-section having an elongated opening facing the mixing chamber outlet and a wall facing the mixing chamber inlet, a cross-sectional area of the end portion of the mixer tube being at least 40% of a cross sectional area of the mixing chamber at a point where the mixer tube extends into the mixing chamber and an end tip of the mixer tube being spaced from a wall of the mixing chamber opposite the aperture by a distance not more than 20% of a width of the mixing chamber.

11 Claims, 2 Drawing Sheets

(51) Int. Cl.
*B01F 3/02* (2006.01)
*B01F 5/00* (2006.01)

(56) References Cited

U.S. PATENT DOCUMENTS

| | | | |
|---|---|---|---|
| 4,222,356 A * | 9/1980 | Ueda et al. | 123/568.18 |
| 4,329,965 A * | 5/1982 | Ueda et al. | 123/568.18 |
| 5,196,148 A * | 3/1993 | Nigrelli | 261/76 |
| 5,492,104 A | 2/1996 | Elder | |
| 6,427,671 B1 * | 8/2002 | Holze et al. | 123/568.17 |
| 6,513,508 B2 * | 2/2003 | Fischer et al. | 123/568.17 |
| 6,672,292 B2 * | 1/2004 | Fischer | 123/568.17 |
| 6,776,146 B1 * | 8/2004 | Ricart-Ugaz et al. | 123/568.17 |
| 6,886,544 B1 * | 5/2005 | Bui | 123/568.18 |
| 6,907,868 B2 * | 6/2005 | Veinotte | 123/568.18 |
| 6,981,492 B2 * | 1/2006 | Barba et al. | 123/568.15 |
| 7,069,919 B1 * | 7/2006 | Atkinson et al. | 123/568.19 |
| 7,128,039 B2 * | 10/2006 | Cooper | 123/184.47 |
| 7,740,008 B2 * | 6/2010 | Brogdon et al. | 123/568.15 |
| 7,908,859 B2 * | 3/2011 | Carlsson et al. | 60/605.2 |
| 2002/0112708 A1 * | 8/2002 | Fischer et al. | 123/568.17 |
| 2002/0185116 A1 * | 12/2002 | Veinotte | 123/568.18 |
| 2003/0084887 A1 * | 5/2003 | Veinotte | 123/568.18 |
| 2003/0111066 A1 * | 6/2003 | Veinotte | 123/568.18 |
| 2004/0112345 A1 | 6/2004 | Bertilsson | |
| 2004/0177839 A1 * | 9/2004 | Veinotte | 123/568.18 |
| 2009/0235906 A1 * | 9/2009 | Schill et al. | 123/568.18 |

FOREIGN PATENT DOCUMENTS

| | | |
|---|---|---|
| JP | 2000097111 A | 4/2000 |
| JP | 2001234815 A | 8/2001 |
| JP | 2004100653 A | 4/2004 |
| JP | 2007-247626 A | 9/2007 |
| WO | 2006/129371 A1 | 12/2006 |

OTHER PUBLICATIONS

Patent Abstract of EP1384867 A1; Jan. 28, 2004; Daimler Chrysler AG.

Extended European search report dated Jul. 15, 2015 for corresponding European application No. 08724775.5.

* cited by examiner

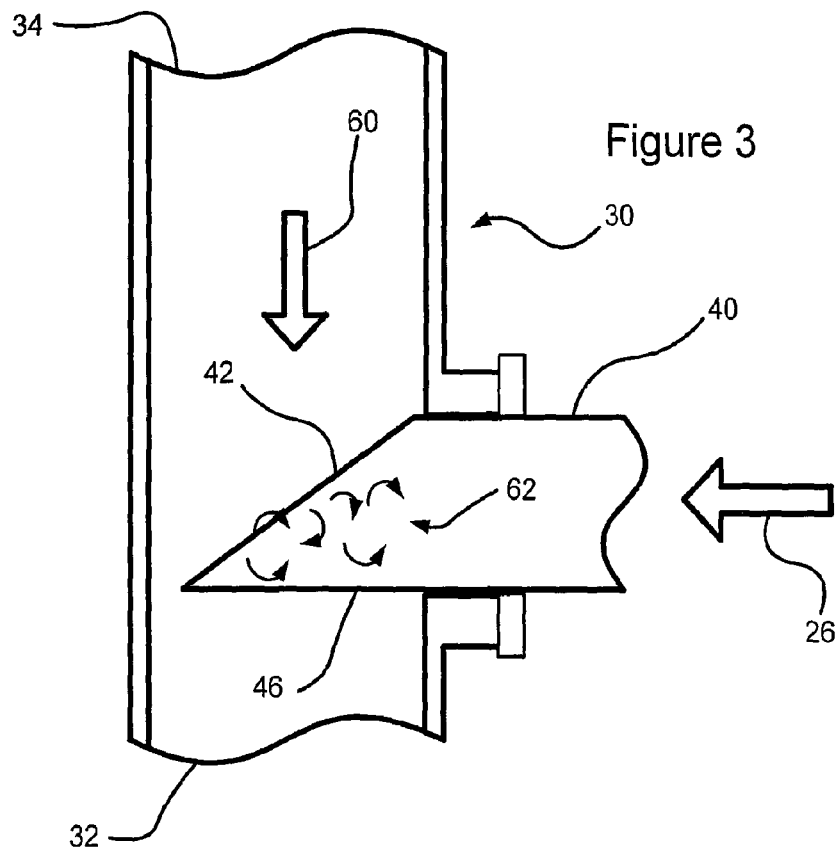
Figure 3
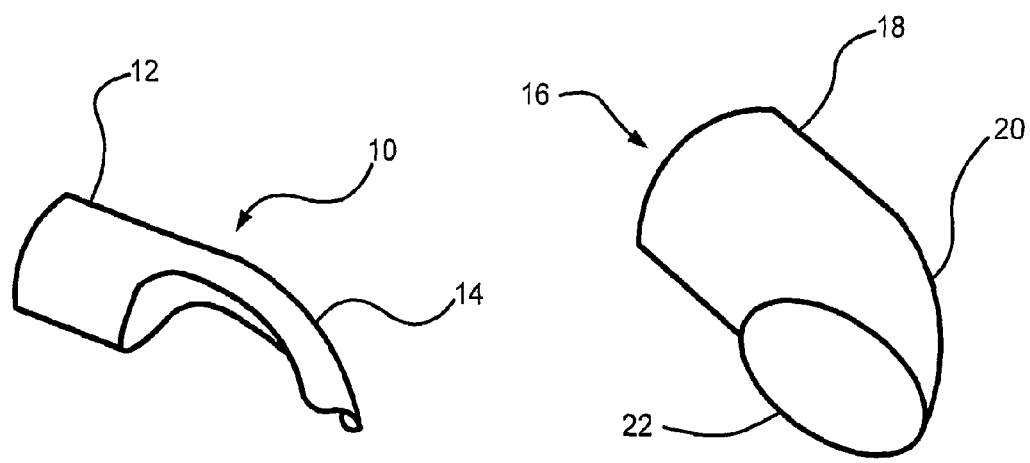
Figure 4
(Prior Art)
Figure 5
(Prior Art)

EXHAUST GAS RECIRCULATION MIXER DEVICE

FIELD OF THE INVENTION

The invention relates to internal combustion engine air intake devices, and more specifically to a device for mixing recirculated exhaust gas into engine intake air.

BACKGROUND AND SUMMARY

Modern diesel engines require exhaust gas recirculation ("EGR") to the engine air intake to comply with engine exhaust regulations for NOx emissions. Methods and apparatus for exhaust gas recirculation are known, and typically divert a portion of gas exhausted from the cylinders, filter and cool it, and mix it into the intake charge air. Cylinder-to-cylinder EGR distribution is important for achieving compliance with exhaust emission regulations, maintaining acceptable engine operation, and to operating with optimal brake specific fuel consumption ("BSFC"). Thorough mixing of EGR with incoming charge air is required to meet these criteria. Current EGR mixer designs struggle to meet these requirements across all engine operating speeds.

Currently known solutions include, for example, mixers based on the venturi principle, as shown in U.S. Pat. No. 6,343,594 to Keoslin et al., and U.S. Pat. No. 6,267,106 to Feucht. Other known mixers disclose tubes that introduce exhaust gas in the inlet air stream direction, including U.S. Pat. No. 6,425,382 to Marthaler et al., U.S. Pat. No. 6,672,292 to Fischer, and U.S. Pat. No. 6,889,673.

U.S. Pat. No. 6,427,671 to Holze et al. shows a tube having a slanted opening with a truncated tip. The wall portion of the tube divides an inlet air flow, which rejoins on a downstream side of the tube to mix with incoming exhaust gas.

U.S. Pat. No. 5,492,104 to Elder et al. discloses an exhaust gas mixing tube mounting for a gasoline engine.

FIG. 4 shows an exhaust gas mixing tube 10 owned in common with the present invention. The mixing tube 10 of FIG. 4 has a cylindrical first part 12 transitioning into a curved, scoop-shaped guide wall 14 that curves into the direction of flow and flares outward laterally (relative to the tube axis) to direct exhaust gas into an inlet air flow.

FIG. 5 shows another mixer tube 16 owned in common with the mixing device of the invention. The mixer tube 16 has a cylindrical first part 18 followed by an elbow 20 bending about 90° relative to an axis of the first part and terminating in a mouth 22 to direct exhaust into an inlet air flow in the direction of the inlet air flow.

A device in accordance with the invention for mixing exhaust gas in an engine air intake includes a mixing chamber disposed or formed in an air intake conduit and a mixer tube to introduce exhaust gas into the mixing chamber. The mixer tube is connected to a source of exhaust gas to be recirculated to the engine.

The mixing chamber has an inlet for receiving intake air and an outlet for exhausting the intake air, and having an aperture or port between the inlet and the outlet, and, a mixer tube extending into the aperture, an end portion of the mixer tube disposed in the mixing chamber shaped as a cylindrical-section having an elongated bevelled opening facing the mixing chamber outlet and a wall facing the mixing chamber inlet. Exhaust gas enters the engine air intake flow in the mixing chamber through the elongated opening.

According to another aspect of the invention, an edge of the wall of the end portion of the mixer tube defining the elongated opening is oriented at not less than about 50° to the longitudinal axis of the mixer tube.

According to a preferred embodiment of the invention, a cross-sectional area of the end portion of the mixer tube is at least 40% of a cross sectional area of the mixing chamber at a point where the mixer tube extends into the mixing chamber. The wall of the mixer tube forms a paddle that causes the intake air to flow around the wall, facilitating exhaust gas entering the mixing chamber to mix with the charge air.

At low engine speeds and associated low intake air flows, pressure pulsations cause the charge air flow to reverse direction. The elongated opening provides a backflow mixing volume that collects the reverse flow and allows the air to mix with incoming exhaust gas.

According to the invention, the elongated opening of the mixer tube extends substantially a length of the mixer tube disposed in the mixing chamber.

According to another aspect of the invention, the edge of the wall of the end portion of the mixer tube defining the elongated opening is formed to be substantially elliptical. The substantially elliptical opening forms a curved tip at the end of the mixer tube.

According to another aspect of the invention, the tip of the mixer tube is spaced from a wall of the mixing chamber opposite the aperture by a distance not more than 20% of a width of the mixing chamber.

The tip of the mixer tube provides an edge that with the narrow spacing of the tip from the mixing chamber wall produces vortex shedding in the air flow during high air flow rates. The vortex shedding in the air flow helps mix charge air with the exhaust entering through the mixer tube opening.

According to yet another aspect of the invention, the mixer tube wall at least at the tip has a thickness that is not more than about 10% of a tube diameter.

BRIEF DESCRIPTION OF THE DRAWINGS

The invention will be better understood by reference to the following detailed description in conjunction with the appended drawings, in which:

FIG. 3 is a view of the device of FIG. 1 showing flow characteristics during low engine speed;

FIG. 4 is a perspective view of a prior art mixing tube; and,

FIG. 5 is a perspective view of another prior art mixing tube.

DETAILED DESCRIPTION

Figure 1:
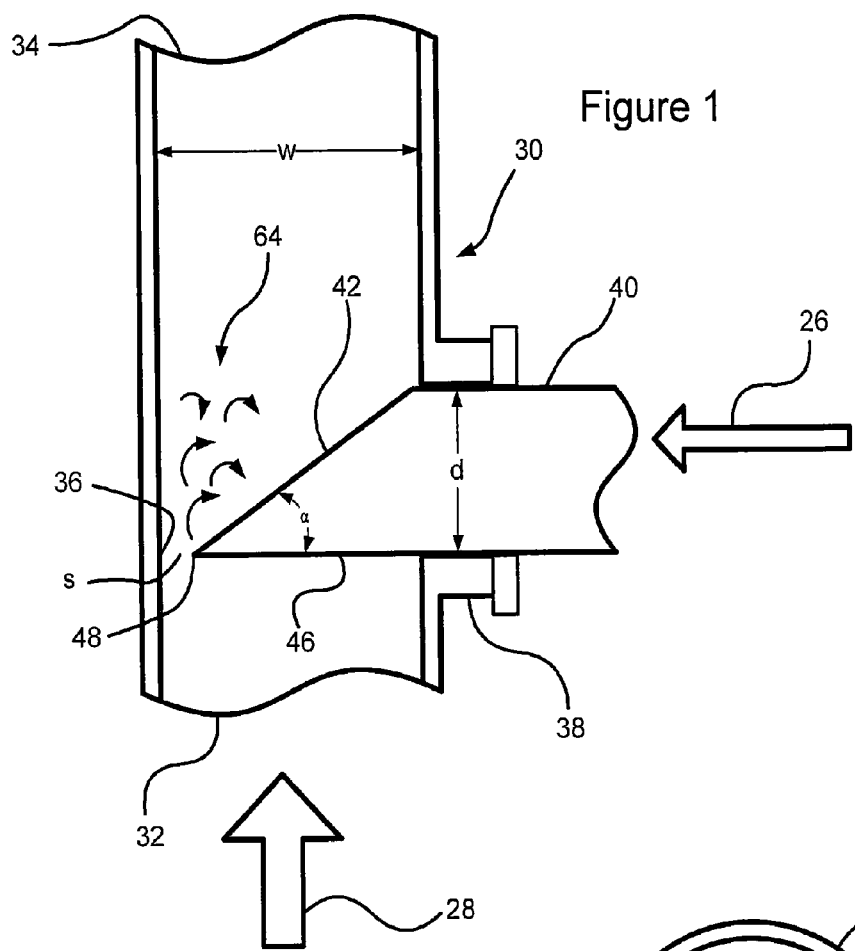
FIG. 1 is a schematic view of an exhaust gas recirculation mixing device in accordance with the invention showing flow characteristics during high engine speed.
Figure 2:
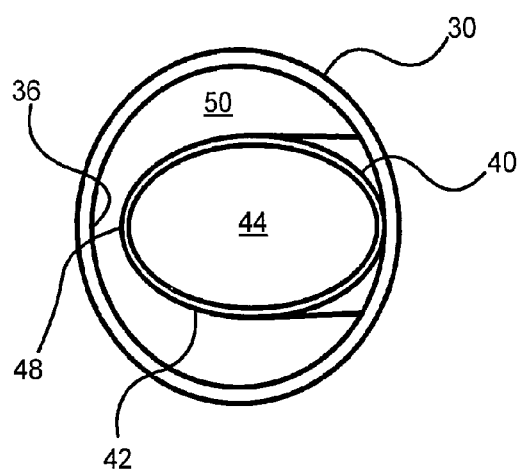
FIG. 2 is an end view of the device of FIG. 1 looking opposite a flow direction of a mixing chamber, that is, from the top of the view of FIG. 1.

An Exhaust Gas Recirculation ("EGR") mixing device in accordance with a preferred embodiment of the invention is shown in schematic view in FIGS. 1, 2 and 3.

The mixing device according to the invention includes a mixing chamber 30 that may be disposed in the charge air or inlet air conduit structure of an internal combustion engine (not illustrated) to allow exhaust gas 26 to mix with the inflowing charge air 28. The mixing chamber 30 may be simply a designated portion of the inlet conduit, or may be shaped as required by its specific location. Alternatively, the mixing chamber 30 may be a separate component connected in the charge air conduit. The mixing chamber 30 includes an inlet 32 for receiving charge air from a charge air source, which may include a turbocharger, charge air cooler and other devices as are known in the art. The mixing chamber 30 also includes an outlet 34 to discharge charge air, which will be mixed with exhaust gas if exhaust gas recirculation is being performed. A direction from the inlet 32 to the outlet 34 defines a flow direction of the mixing chamber 30. The mixing chamber 30 also includes a port 38 between the inlet 32 and the outlet 34 to accept exhaust gas 26 for mixing in the chamber 30.

A mixer tube 40 is mounted to extend substantially perpendicularly (relative to the flow direction) into the mixing chamber 30 through the port 38. The mixer tube 40 is formed as a cylindrical length of tube terminating in an end portion defined by a bevelled opening 42. Alternatively, the mixer tube may be formed as an integral part of the mixing chamber 30.

According to the invention, the bevelled opening 42 is cut at an angle α greater than 50° relative to a longitudinal axis of the tube 40. The bevelled opening 42 defines a substantially elliptical mouth or outlet 44, which may be better viewed in FIG. 2, oriented to face in a downstream flow direction of the mixing chamber 30 for introducing exhaust gas into the mixing chamber. A wall 46 of the end portion, which is accordingly oriented in an upstream direction of the mixing chamber 30, forms a "paddle" that, as explained in greater detail below, has two functions. Briefly, in one function, the paddle wall 46 guides charge air to flow around the bevelled opening 42, that is, through the space 50 surrounding the opening 42 as shown in FIG. 2, and mix with exhaust gas entering the mixing chamber 30 from the mouth 44. According to a second function, the paddle wall 46 captures charge air during reverse flow pulsations at lower engine speeds, and promotes mixing of the captured charge air with recirculating exhaust gas.

The bevelled opening 42, as may be seen in FIG. 2, is substantially elliptical in shape. The substantially elliptical opening 42 forms a curved tip 48 at the end of the mixer tube 40.

Preferably, the mixer tube wall at least at the tip 48 has a thickness that is not more than about 10% of a diameter d of the mixer tube 40.

According to a preferred embodiment of the invention, best viewed in FIG. 2, a cross-sectional area of the end portion of the mixer tube 40, the frontal area of the tube presented to the mixing chamber 30 flow, is at least 40% of a cross sectional area of the mixing chamber 30 at a point where the mixer tube extends into the mixing chamber.

According to another aspect of the invention, a tip 48 of the mixer tube 40 is spaced from a wall 36 of the mixing chamber 30 opposite the port 38 by a distance s not more than 20% of a width w of the mixing chamber. The distance between the tip 48 and the mixing chamber wall 36 is preferably no less than about a wall thickness of the tube.

The mixing device in accordance with the invention is configured to perform advantageously at both lower engine speeds and accordingly lower charge air flows and higher engine speeds and accordingly higher charge air flows. Turning now to FIG. 3, at low engine speeds, pressure pulsations caused by the opening and closing of the cylinder valves are prevalent within the intake manifold and the mixing chamber 30. These pressure pulses cause the flow in the mixing chamber 30, which includes EGR flow and fresh air flow, to reverse direction, as indicated by arrow 60. The paddle wall 46 captures a large portion of the reverse flow and guides it into the tube 40, where the reverse flowing air mixture collides and mixes, as indicated by the small curved arrows 62, with exhaust gas 26 flowing in the tube. This more thoroughly mixed charge is then introduced to the mixing chamber 30 during the next induction of the combustion cycle.

Returning to FIG. 1, at higher engine speeds, pressure pulses are no longer a dominant factor in mixing. As engine speed increases the amount of available time for mixing and transport is reduced, making fast mixing important. As mentioned, the mixer tube 40 protruding into the mixing chamber 30 reduces the cross sectional area within the mixing chamber for charge air flow. The reduced area 50 (see FIG. 2) causes the charge air to accelerate around the mixer tube 40. This increase in velocity creates a local low pressure in the charge air. The acceleration and resultant pressure change is greatest at the tip 48 of the mixer tube because the area reduction is greatest at that location. As the air charge moves past the tip 48 of the mixer tube 40 it encounters a region of relatively high pressure exhaust gas flowing into the mixing chamber 30 from the mouth 44. The difference in pressures creates fluid shear within the air flow which results in vortex shedding, indicated by the small arrows 64. These chaotic random flow patterns cause more thorough mixing of the incoming exhaust gas flow and accelerated charge air flow. Although illustrated in relation to the tip of the mixer tube, where vortex formation is strongest, some degree of vortex shedding occurs around the periphery of the bevelled opening, in particular, at about half the bevelled opening including the tip 48, which is considered the leading edge of the opening.

The proposed design is more effective at mixing EGR with fresh charge air across engine operating speeds, is simple to construct, is robust, and is low cost.

The invention has been described in terms of preferred principles, embodiments, and components; however, those skilled in the art will understand that equivalents may be substituted for what has been described here without departing from the scope of the invention as defined by the appended claims.

What is claimed is:

1. A device for mixing exhaust gas in an engine air intake, comprising:
    a mixing chamber disposed in an air intake conduit, the mixing chamber having an inlet for receiving intake air and an outlet for exhausting the intake air, and having a port between the inlet and the outlet; and,
    a mixer tube extending through the port, an end portion of the mixer tube disposed in the mixing chamber shaped as a straight cylinder sectioned to have an elongated elliptical opening facing the mixing chamber outlet and a wall facing the mixing chamber inlet, an end tip of the mixer tube is spaced from a wall of the mixing chamber opposite the port by a distance not more than 20% of a width of the mixing chamber.

2. The device as claimed in claim 1, wherein a cross-sectional area of the end portion of the mixer tube being at least 40% of a cross sectional area of the mixing chamber at a point where the mixer tube extends into the mixing chamber.

3. The device as claimed in claim 1, wherein an edge of the wall of the end portion of the mixer tube defining the elongated opening is oriented at not less than about 50° to the longitudinal axis of the mixer tube.

4. The device as claimed in claim 1, wherein the mixing chamber has a flow axis from the inlet to the outlet, and wherein an edge of the wall of the end portion of the mixer tube defining the elongated opening is substantially elliptical in cross section perpendicular to the flow axis of the mixing chamber.

5. The device as claimed in claim 1, wherein the elongated opening of the mixer tube extends substantially a length of the mixer tube disposed in the mixing chamber.

6. The device as claimed in claim 1, wherein a mixer tube wall at least at the end tip has a thickness that is not more than about 10% of the mixer tube diameter.

7. A device for mixing exhaust gas in an engine air intake, comprising:
- a mixing chamber disposed in an air intake conduit, the mixing chamber having an inlet for receiving intake air and an outlet for exhausting the intake air, and having a port between the inlet and the outlet; and,
- a mixer tube extending through the port, an end portion of the mixer tube disposed in the mixing chamber shaped as a straight cylinder sectioned obliquely to a longitudinal axis thereof to form a bevelled elongated opening facing the mixing chamber outlet and a wall facing the mixing chamber inlet, an end tip of the mixer tube is spaced from a wall of the mixing chamber opposite the port by a distance not more than 20% of a width of the mixing chamber and a cross-sectional area of the end portion of the mixer tube being at least 40% of a cross sectional area of the mixing chamber at a point where the mixer tube extends into the mixing chamber.

8. A device for mixing exhaust gas in an engine air intake, comprising:
- a mixing chamber disposed in an air intake conduit, the mixing chamber having an inlet for receiving intake air and an outlet for exhausting the intake air, and having a port between the inlet and the outlet; and,
- a mixer tube extending through the port, an end portion of the mixer tube disposed in the mixing chamber shaped as a straight cylinder sectioned to have an elongated elliptical opening facing the mixing chamber outlet and a wall facing the mixing chamber inlet, an end tip of the mixer tube is spaced from a wall of the mixing chamber opposite the port by a distance such that vortex shedding is produced in an air flow past the end tip.

9. The device for mixing exhaust gas in an engine air intake as claimed in claim 8, wherein the end tip of the mixer tube is spaced from the wall of the mixing chamber opposite the port by a distance not less than a thickness of the mixer tube wall.

10. The device for mixing exhaust gas in an engine air intake as claimed in claim 9, wherein the end tip of the mixer tube is spaced from the wall of the mixing chamber opposite the port by a distance not greater than 20% of the mixing chamber width.

11. The device as claimed in claim 1, wherein the end tip of the mixer tube is spaced from the wall of the mixing chamber opposite the port by a distance not less than a thickness of the mixer tube wall.

\* \* \* \* \*